United States Patent [19]

Hiddleson

[11] Patent Number: 4,731,549
[45] Date of Patent: Mar. 15, 1988

[54] CURRENT SENSOR AND CONTROL DEVICE

[76] Inventor: Thomas V. Hiddleson, 1010 Morse Ave., Sunnyvale, Calif. 94089

[21] Appl. No.: 661,063

[22] Filed: Oct. 15, 1984

[51] Int. Cl.$^4$ .......................................... H01H 47/00
[52] U.S. Cl. ..................................... 307/125; 307/38; 307/113; 307/115
[58] Field of Search ............... 307/113, 114, 115, 116, 307/117, 125, 126, 130, 131, 38, 39; 340/641, 642, 568, 680, 657, 660, 663, 664, 674; 361/6, 18, 56, 79, 88, 89, 90, 91, 92, 93

[56] References Cited

U.S. PATENT DOCUMENTS

| | | | |
|---|---|---|---|
| 3,416,001 | 12/1968 | Fistell | 307/38 |
| 3,560,861 | 2/1971 | Milleker et al. | 307/130 X |
| 3,657,603 | 4/1972 | Adams | 361/90 X |
| 3,836,790 | 9/1974 | Becker | 361/90 X |
| 3,895,263 | 7/1975 | Clark | 361/93 X |
| 3,962,606 | 6/1976 | Burns et al. | 361/93 X |
| 4,008,403 | 2/1977 | Rose | 307/113 |
| 4,012,668 | 3/1977 | Wittlinger | 361/93 X |
| 4,027,203 | 5/1977 | Moran et al. | 361/89 X |
| 4,034,269 | 7/1977 | Wilkinson | 361/187 X |
| 4,054,802 | 10/1977 | Mock | 307/38 |
| 4,255,669 | 3/1981 | Naugle | 307/130 X |
| 4,331,996 | 5/1982 | Matsko et al. | 361/92 |
| 4,383,186 | 5/1983 | Liang | 307/113 |
| 4,395,640 | 7/1983 | Bone | 307/115 |
| 4,419,589 | 12/1983 | Ross | 307/39 |
| 4,466,041 | 8/1984 | Witulski et al. | 361/93 |
| 4,525,634 | 6/1985 | Southard | 307/115 |

OTHER PUBLICATIONS

"Hifi Auto-Switch", by *Electronic*, Australia (Mar. 1980), vol. 41, No. 12.

*Primary Examiner*—William M. Shoop, Jr.
*Assistant Examiner*—Paul Ip
*Attorney, Agent, or Firm*—Jones, Tullar & Cooper

[57] ABSTRACT

Presented is a current sensor and control device which when connected into a 120 Volt AC circuit senses that alternating current is present in the circuit and controls the application of such current in such manner that electric power cannot be drawn unless the sensor senses that a load is being imposed on the alternating current circuit.

3 Claims, 3 Drawing Figures

CURRENT SENSOR AND CONTROL DEVICE

BACKGROUND OF THE INVENTION

1. Field of the Invention

This invention relates to control devices, and particularly to an alternating current sensor and control device which senses the presence of an alternating current load in a circuit, signals the fact that the alternating current circuit is energized, and which disables the alternating current circuit if the sensing and signaling means are disabled or inoperative.

2. Description of the Prior Art

U.S. Pat. No. 3,258,693 discloses a device for indicating an abnormal flow of current in a utilization circuit. The utilization circuit includes a glow discharge device. When normal current is flowing through the utilization circuit, the current load is not sufficient to illuminate the glow discharge device. However, if an abnormal amount of current flows through the utilization circuit, then the glow discharge device is illuminated and indicates the abnormal condition.

U.S. Pat. No. 3,768,012 teaches a power supply direct current detector system for direct current power supplies in which the direct current power supply uses a filter choke inductor. The detector uses the winding resistance of the filter choke to sense the direct current output. Two problems are explained with respect to this method of detecting current. One problem is the fact that the voltage developed across the inductance of the choke must be rejected. The second problem is that the temperature drift of the choke winding resistance must be compensated. According to the specification of this patent, both of these problems are solved by the direct current detector system taught by this patent.

U.S. Pat. No. 3,857,096 relates to an electrical current leakage detector circuit in which an induction coil is used to detect the flow of current in a conductor, with a differential amplifier connected to the secondary coil to detect the flow of extremely small currents. The differential amplifier is in turn connected to a visual or audible device for indicating the presence of electrical current in the circuit.

U.S. Pat. No. 3,863,150 discloses a structure which may be constructed in the form of a male-female plug that indicates first whether or not the circuit into which the plug is connected is an active circuit, and secondly, whether the implement connected to the plug is drawing current from the circuit.

U.S. Pat. No. 4,052,664 illustrates still another device for monitoring an electrical circuit to determine whether the power is on and the circuit is working.

The prior art is of course replete with sensing and indicating devices that can be tapped into both alternating and direct current circuits to signal the fact that a circuit is energized. While all of these sensing and signaling devices are important and serve a useful function, it is surprising that the patent literature does not teach, nor is there available on the market, a sensing and signaling device that incorporates a safety function that disables the alternating current circuit if the sensing and signaling device is either omitted or is itself disabled for any reason.

Accordingly, it is one of the important objects of the present invention to provide a current sensing and circuit control device that incorporates a sensing and load signaling means which disables the alternating current circuit to which it is connected if the sensing and load signaling means is removed from the circuit or is disabled for any reason.

Another object of the invention is to provide a current sensor and circuit control device which senses the presence or absence of alternating current in a circuit and signals the fact that alternating current is being drawn from such circuit.

Still another object of the invention is the provision of an AC current sensor and control device incorporating a sensing and circuit load means effective to control one or more alternating current outlets in the circuit.

There are many circuits that are equipped with sensing and signaling devices to indicate that a circuit is energized, i.e. that voltage and current are present in the circuit. However, I have been unable to find any such safety devices incorporated in alternating electrical circuits in which energization of the entire AC distribution circuit is dependent on the sensor and circuit load means drawing current from the circuit. Accordingly, a still further object of the invention is the provision of a current sensing and control device for use with a power distribution device such as a power strip including a multiplicity of AC power outlet receptacles, in which one of the receptacles accommodates a current sensing and circuit load device the operation of which controls the transmission of electrical current to all the other outlet receptacles in the power strip.

Another object of the invention is the provision of a junction box in the nature of a receptacle having a plurality of outlet receptacles all of which may be connected to a source of AC electrical energy, and all of which electrical outlet receptacles are controlled in the performance of their intended function of power distribution by the performance of sensing and circuit load means operatively connected into the circuit.

Still another object of the invention is the provision of a current sensor and circuit control device incorporated into a power distribution device in which a multiplicity of electrical outlet receptacles are controlled by operation of a sensing and signaling means which indicate that a load is being imposed on the circuit, and which has a very wide range of operation, sensing a load as low as 3 watts and as high as several thousand watts without any modification or "pre-programming" of component values for a particular range of operations.

Still another object of the invention is a current sensor and control device which can be built into a small enclosure, e.g., a conventional power distribution strip, a stand-alone box or a wall receptacle.

A still further object of the current sensor and control device is to provide a circuit switching capability incorporating a safety feature which has wide application in the switching field, e.g., in a situation where multiple switched outlets and one sense and control outlet is provided, this invention can be used to activate other associated devices when the sense and control outlet is energized. In like manner, in an application, e.g., involving a component stereo system, this invention can be used to activate simultaneously the receiver, tape deck, and pre-amp and other components associated with the stereo system when the sense and control receptacle is energized. With the advent of computers, and word processing equipment controlled by computers, there are many components that must individually be turned on when the computer is turned on. This is not always convenient. The power switches for the separate components are not always easy to reach; the sequence in which they are turned on is not always advantageous; and if one essential component is not turned on through inadvertence, it can disrupt the operation of the entire computer system. Accordingly, it is another object of the present invention to provide a current sensing and control device which may be utilized in this environment whereby energizing the sense and control load will effectively simultaneously activate the disc drive, the line printer, the terminal, the video monitor, and any other selected components.

There are other applications in which it is advantageous that an electrical power outlet strip for electrical power distribution and having multiple electrical outlets be provided with multiple sense outlets and only one switched or controlled outlet. In this application, the current sensor and control device of the invention may be incorporated so that the switched or controlled outlet is activated if any of the sensed outlets are activated. Accordingly, it is another object of the present invention to provide a current sensor and control device that will fulfill this function.

The invention possesses other objects and features of advantage, some of which, with the foregoing will be apparent from the following description and the drawings. It is to be understood that the invention is not limited to the embodiment illustrated and described, since it may be embodied in various forms within the scope of the appended claims.

SUMMARY OF THE INVENTION

In terms of broad inclusion, the current sensor and control device of the invention is illustrated in relation to an electrical power distribution "strip" having a multiplicity of electrical outlet receptacles or outlets. In the embodiment illustrated, five such electrical outlets are provided with four of the outlets being controlled by whether or not the fifth or remaining outlet is drawing power from the circuit. If the fifth or remaining outlet is drawing power from the circuit, then the remaining four are automatically energized. On the other hand, if the fifth or remaining outlet is not drawing power from the system, then the remaining four outlets are disabled and power cannot be drawn from them. Thus, the fifth outlet is not only connected into the circuit, it draws an electrical current load to enable or energize the remaining circuit outlets. Structurally, the current sensor and control device of the invention includes a 5 VDC power supply the output of which is channelled to a control circuit which includes a toroidally wound induction coil for sensing the existence of current flow in a 120 VAC or other electrical conductor, with the low voltage induced signal of the toroidal inductor being channelled to a sense amplifier section of the control circuit which functions to provide a one-shot pulse output that is channelled into a signal buffer the output of which constitutes a TTL level square wave whose frequency is the line frequency, in this case, 60 Hz. This line frequency square wave is then applied to a negative recovery monostable multivibrator, the output of which is inverted and applied to an opto coupler with triac output which controls the conductive or non-conductive state of an output triac, connected in common with one terminal of each of the controlled outlets in the distribution circuit. The output triac of the control circuit is also connected to one lead of the 120 VAC line, while the same 120 VAC line passes through the toroidal wound inductor and terminates in the sensor and control outlet of the distribution box. Switch means are provided to activate the sensor and load unit, and it is preferable that the switch means be illuminated to indicate its conductive condition when in the "on" position.

DESCRIPTION OF THE PREFERRED EMBODIMENT

Figures 1, 2:
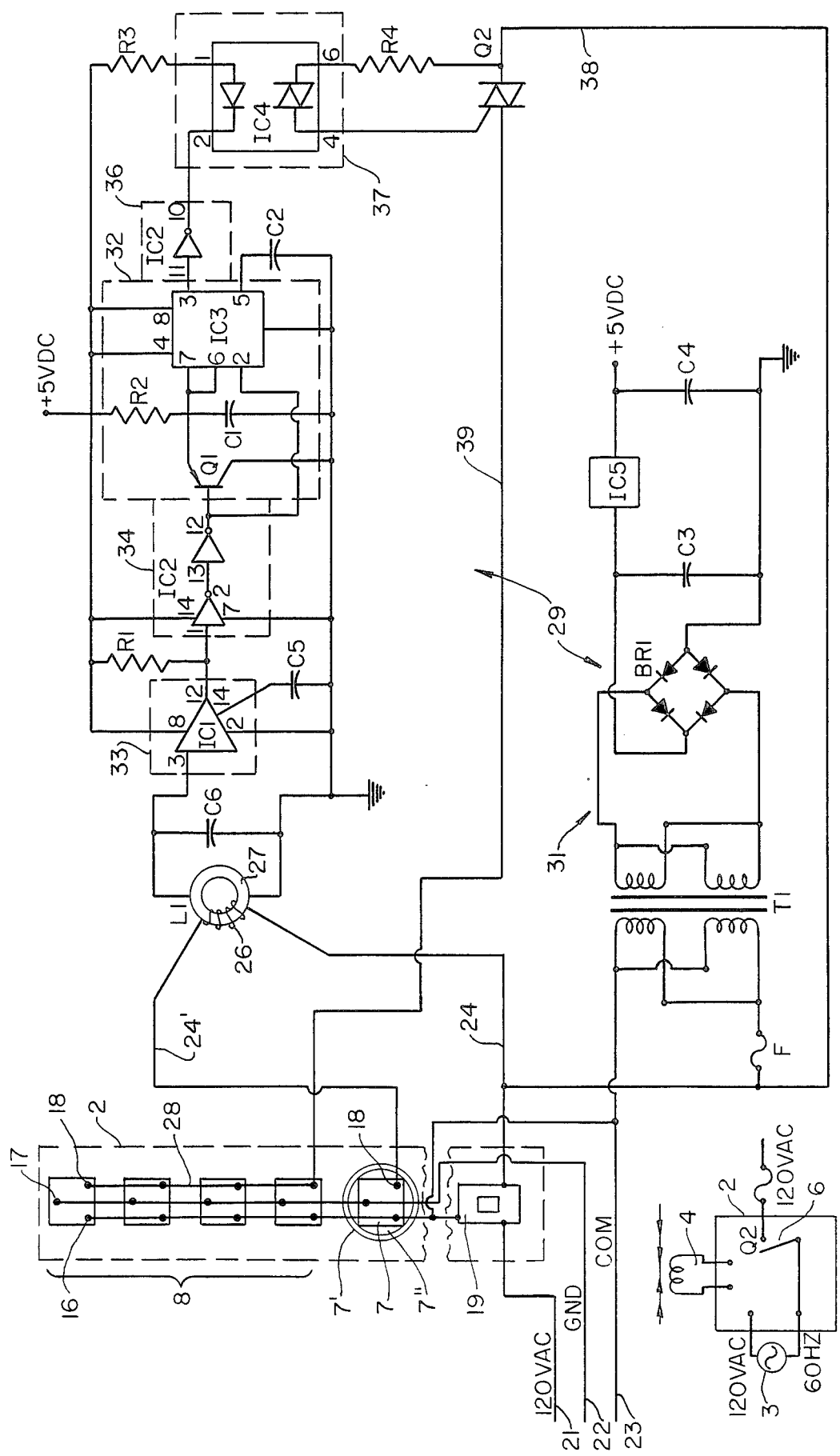
FIG. 1 is a diagrammatic view of the current sensor and control device of the invention.
FIG. 2 is a schematic view illustrating the current sensor and control device interconnected with a 120 VAC electric power distribution strip having four controlled outlets and one sensing/control outlet for controlling the other four outlets.

In terms of greater detail, the current sensor and control device of the invention is illustrated in broad diagrammatic form in FIG. 1, where it is seen that the invention may be enclosed within a housing 2, with power being channelled to the housing from a source 3 of alternating current. In the instance illustrated, a 120 Volt alternating current at 60 hertz is provided. Obviously, other voltages and other frequencies could be accommodated. One of the leads from the 120 Volt source passes through the inductor 4, inducing a current and voltage in the inductor coil which is channelled into the housing and imposed on the control circuit enclosed therewithin. Within the housing is provided switching means 6 which is appropriately actuated by the control circuit to provide a 120 Volt AC outlet when the sensor/load of the control circuit is activated.

In more specific detail, and referring to FIG. 3, it will there be seen that the invention is illustrated as applied to an elongated electrical power distribution strip having an elongated housing 2 into which the 120 Volt AC power is channelled by appropriate leads designated collectively by the number 3. In the interest of brevity in this description, it is believed that a description of the different modes in which the current sensor and control device as incorporated into a power strip may operate will facilitate an understanding of the detailed operation and construction of the circuitry as illustrated in FIG. 2. Thus, again referring to FIG. 3, the elongated electrical power distribution strip 2 is provided with five electrical receptacles or outlets one of which, designated by the number 7 in FIG. 3A, may be considered the sensing and control outlet, while the remaining four designated collectively by the numeral 8 may be considered the controlled or switched outlets. As illustrated, the power strip is provided with an ON-OFF switch 9 which may, or may not, be the type that is illuminated when it is in an "ON" condition. In the interest of safety, it is preferred that the switch 9 be of the "rocker" type and that it be illuminated when it is in "ON" position as illustrated in FIGS. 3B through 3E.

Figure 3A:
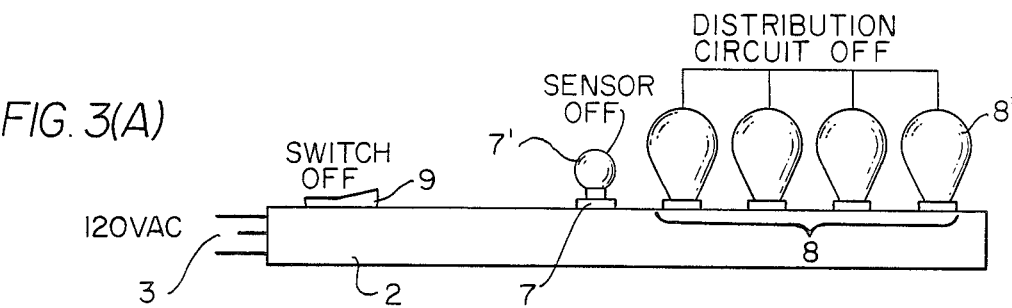
FIG. 3 is a composite view illustrating in side elevation five electrical power distribution strips and indicating the condition of the controlled outlets of each as a functional response to the condition of the sensor/control outlet of each strip.

Referring to FIG. 3A, with the switch 9 OFF, all power is interrupted to both the sensor/control outlet 7 and the controlled outlets 8. Accordingly, the sensor is OFF and so is the load circuit. In the illustration, the control load has been illustrated as being an electric light bulb, preferably red in color, so as to emphatically alert an operator.

Figure 3B:
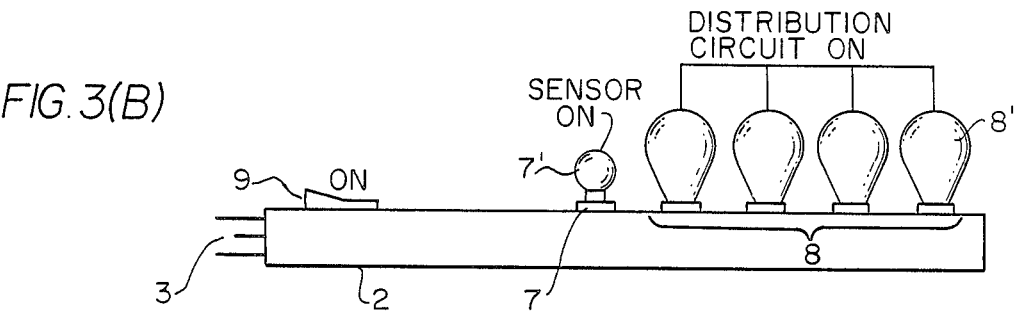

In FIG. 3B, the switch 9 has been switched ON, the sensor has been activated and the indicating bulb 7' has been illuminated and is therefore drawing a load from the electrical circuit, and the controlled outlets 8 are likewise energized, resulting in illumination of the bulbs 8'.

Figure 3C:
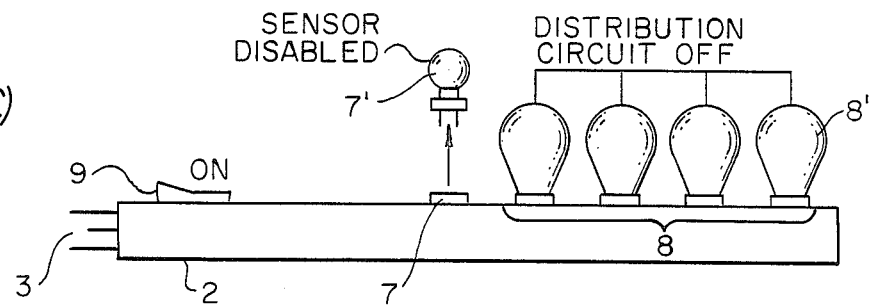

In FIG. 3C, the switch 9 is ON, but the load has been eliminated by withdrawing the signal bulb 7' and the socket into which it is seated from the sensor and control outlet 7. As illustrated, this results in the power distribution circuit being disabled, so that all of the bulbs 8' are now in an OFF condition.

Figure 3D:
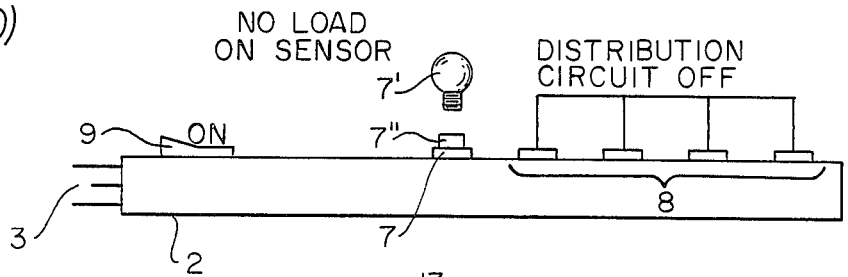

In FIG. 3D, the main switch 9 is again in the ON condition, but the adaptor 7" within which the bulb 7' is seated has been left inserted in the outlet 7 so that the prongs of the adapter physically make contact between the contact terminals of the outlet 7. However, the signal bulb 7' has been unscrewed from the adaptor so that no load is being drawn through this outlet. Under these circumstances, it will be seen from the diagram that the distribution circuit is also in OFF condition, since it requires that the control outlet 7 be drawing current to effect switching of the remaining outlets 8 to an ON condition.

Figure 3E:
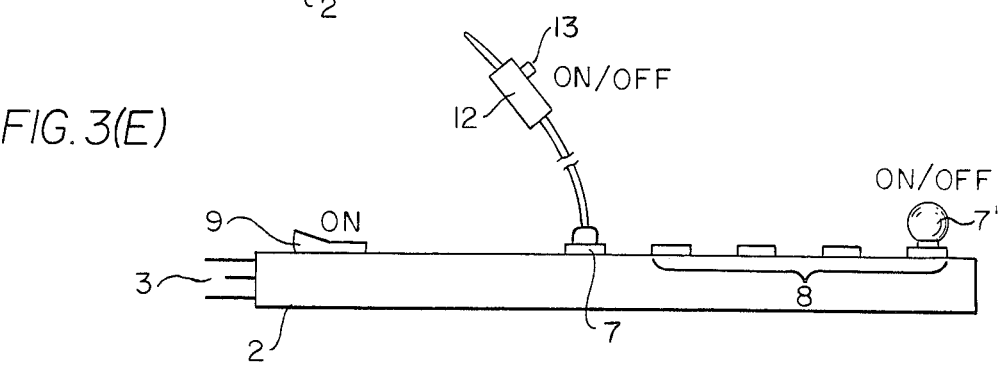

In FIG. 3E, the bulb 7' and its adaptor for operatively engaging the control outlet 7 has been removed, and in its place has been substituted an implement such as a soldering iron 12. The soldering iron is equipped with its own switch 13 so that the soldering iron may be turned ON or OFF. Again, the main switch 9 is turned ON, and with the indicator bulb 7' now relocated to another one of the controlled or switched outlets 8, it is seen that when the soldering iron is turned ON, thus imposing a load on the circuit, the bulb 7' will be illuminated, indicating that the soldering iron is ON and in a dangerous condition. On the other hand, when the soldering iron is turned OFF, then the load is removed from the outlet 7 with the result that the outlets 8 are disabled, resulting in extinguishment of the bulb 7'.

There are many other applications and combinations that may be arranged to take advantage of the sensing and control function associated with the outlet 7. It is believed that the versatility shown by the five examples discussed above and illustrated in FIGS. 3A through 3E disclose the manner in which the invention may be used in many different applications. Such additional applications will be apparent to one skilled in the art.

Referring to FIG. 2, as there shown with greater particularity, the housing of the power distribution strip 2 is illustrated in broken lines and the current sensor and control outlet 7 and the controlled or switched outlets 8 are illustrated schematically, each of the outlets being identical and each having three terminals 16, 17 and 18, the terminal 16 of each outlet being the common terminal, the terminal 17 of each outlet being the ground terminal, and the terminal 18 of each outlet being the line or "hot" terminal. In the interest of brevity and clarity in the drawing, reference numbers 16, 17 and 18 have been applied only to one of the outlets.

Mounted in the housing of the elongated power distribution strip 2, is a switch 19 that is conveniently a single pole-single throw type which, for safety purposes, is of the illuminated type which indicates by being illuminated that it is in the ON condition. When the switch 19 is in an OFF condition, it is not illuminated. The elongated power distribution strip illustrated is connected into a 120 VAC circuit which includes a power lead 21 connected to one terminal of the switch 19, a ground lead 22 which by-passes the switch 19, and is connected as illustrated to the ground terminal 17 of each of the outlet plugs 7 and 8. The 120 VAC input circuit also includes a common lead 23 that is connected as shown to one terminal of the switch 19, and in turn also connected to the terminals 16 of each of the outlets 7 and 8.

The power lead 21 is completed or "made" through the switch 19, and continues from the switch 19 through a lead 24 connected to an appropriate terminal on the switch block 19. The lead 24 extends in multiple turns 26 through a toroidal core 27 and continues by lead 24' to the terminal 18 of the current control outlet 7. It should be noted that the common terminals 18 of the remaining outlets 8 are interconnected by a heavy bus 28 as illustrated, which does not connect with terminal 18 of outlet 7. It should also be noted that the only interconnection between the common terminal 18 of current control outlet 7 and the remaining outlets 8 is through the control device that is designated generally by the numeral 29 which will now be described in detail.

The control device of the invention includes a power supply designated generally by the numeral 31 and including a transformer T1 which may be the type manufactured and sold by Signal Transformer, Inc. under the model designation DPC-12-70. The primary of the transformer is connected to the 120 VAC input, and in combination with a rectifier BR1, a capacitor C3, a voltage regulator IC5 and a capacitor C4, produces a regulated 5 VDC output. The values of these components are indicated in the parts list which follows.

The 5 VDC output from the power supply is applied by an appropriate lead to the control circuit through the negative recovery monostable multivibrator designated generally by the numeral 32. The alternating current flowing through the power lead 24, and more particularly, through the turns 26 wound through the toroidal coil 27, induce a voltage in the coil 27, whose leads are attached to the input of a sense amplifier designated generally by the numeral 33. The sense amplifier 33 may conveniently be the type sold by National Semiconductor, Inc. and designated LM1815 and constituting an adaptive sense amplifier and default gating circuit. The sense amplifier provides a one-shot pulse output whose leading edge coincides with the negative going zero crossing of a ground reference input signal from inductive coil 27. The input signal from the induction coil 27 may be as low as 100 millivolts, thus enabling the current sensor and control device to operate within a very wide range with a very low input voltage.

The output from the amplifier 33 is buffered at 34, the integrated circuit here being a pair of hex inverters utilizing TTL to achieve high speed at nominal power dissipation. These hex inverters are commercially available from National Semiconductor, Inc. under the trade designation DM7404. The output of the buffered signal constitutes a 60 Hz square wave which corresponds to the line frequency of the 120 VAC input. This line frequency square wave is then applied to the negative recovery monostable multivibrator 32 which consists of the transistor Q1 and the integrated circuit IC3 which constitutes a timer manufactured by National Semiconductor, Inc. and available under the trade designation LM555 or NE555. It is the function of the timer to generate accurate time delays or oscillations, whichever is desired. In the time delay mode of operation as illustrated, the time is precisely controlled by external resistor R2 and capacitor C1.

The output from the multivibrator 32 is channelled to the inverter 36 which again may be of the type sold by National Semiconductor under its trade designation DM7404, or equivalent. From the inverter 36, the output signal is channelled into an opto coupler with triac output which is manufactured and sold by Westinghouse under its trade designation MOC3010. The reference number 37 identifies this integrated circuit. The triac output from the opto coupler assembly 37 controls the triac Q2, which is also connected in circuit with an extension 38 of the power lead 21 which applies 120 VAC to one side of the triac Q2, the output of the triac being conducted through an appropriate lead 39 to the terminal 18 of any one of the output receptacles 8.

In summary, it will be seen that the only time that the outlets 8 can be energized, i.e., connected to the 120 VAC input so as to become functional, is when the triac Q2 is in a conductive state. The only time the triac Q2 is in a conductive state, is when it is rendered so by the control circuit 29, and the only time the control circuit 29 will render the triac Q2 conductive is when the current outlet receptacle 7 is drawing current or drawing a load. When these conditions have been satisfied, the distribution circuit is operational and electrical implements connected to the outlets 8 will also be rendered operational. Accordingly, it will be seen that even though the load receiving plug 7" is plugged into the outlet receptacle 7, if the load element, such as the filament of an indicator light, burns out, and is nonoperative, then the entire distribution circuit is shut down and none of the outlets 8 controlled by the current sensor and control outlet 7 will be operative.

I have found that satisfactory results are obtained when the device is fabricated using components having the following values:

BR$_1$—VM06 50 pin at 1 amp;
C$_1$—2.0 uf 15 VDC tantalum;
C$_2$—0.1 uf 25 VDC Disc Ceramic;
C$_3$—220 uf 35 VDC electrolytic;
C$_4$—1.0 uf 35 VDC tantalum;
C$_5$—0.001 uf 12 VDC Disc Ceramic
C$_6$—0.1 uf 12 VDC Disc Ceramic
F$_1$—0.25 amp Pico fuse
IC$_1$—LM1815
IC$_2$—SN7404
IC$_3$—NE555
IC$_4$—MOC3010
IC$_5$—78L05
L$_1$—EC-10000 (TRIAD)
Q$_1$—2N5138
Q$_2$—T2806D
R$_1$—5.1K ohms
R$_2$—8.2K ohms
R$_3$13 200 ohms
R$_4$—180 ohms
T$_1$—DPC 12-70 (SIGNAL)

Having described the invention, what is believed to be new and novel and sought to be protected by letters patent of the United States is as follows.

I claim:

1. A current sensing and control system for alternating current power supplied to a distribution circuit, comprising:
    a source of alternating current power including a first power supply line and a second power supply line;
    an electric power distribution circuit means including at least first and second distribution power lines;
    sensor means including first and second sensor lines, said first sensor line being connected in series between said first power supply line and said first distribution power line and said second sensor line being connected to said second power supply line, and sensor load means connectable across said first an second sensor lines to cause alternating current to flow in said second sensor line;
    control switch means openable and closable to disconnect and connect, respectively, said second power supply line to said second distribution power line;
    control circuit means responsive to the flow of alternating current from said source to said sensor load means, said control circuit means including sensing means coupled to said second sensor line, and pulse circuit means connected between said sensing means and said control switch means to close said control switch means in response to current flow in said sensor load means to thereby connect said distribution circuit in parallel with said sensor load means across said source of alternating current power, said pulse circuit including a sense amplifier responsive to alternating current in said sensing coil means to deliver a signal at its output when its input signal crosses the zero voltage level, buffer measns responsive to the output signal from said amplifier to produce a TTL level square wave having the frequency of said alternating current power source, a negative recovery monostable multivibrator connected to receive said square wave signal and to produce a timed output, and means for applying said timed output from the multivibrator to said switch means to connect said distribution circuit across said source of alternating current power.

2. The system of claim 1, in which said electric power distribution circuit has at least one outlet receptacle into which an electrical appliance may be connected, said control circuit energizing said at least one receptacle when said sensor load means is energized and deenenrgizing said at least one receptacle when said sensor load means is deenergized.

3. The system according to claim 1, in which said electric power distribution circuit means further comprises:
    a housing;
    a plurality of electrical outlet receptacles mounted on the housing, each of said receptacles having at least two terminals for interconnection of the receptacles in parallel across said alternating current power source; and
    a selectively actuated, make or break power switch mounted on said housing and connected in said second power supply line to make or break said second power supply line;
    and wherein said sensor means includes a control receptacle mounted on said housing and connected to said power switch so as to be selectively energized or deenergized by actuation of said power switch; and wherein
    sensor load means is connected to said control receptacle to be selectively energized thereby when said power switch is actuated to make said second power supply line.

* * * * *